(12) United States Patent
Hassell

(10) Patent No.: US 8,657,305 B1
(45) Date of Patent: *Feb. 25, 2014

(54) SELF-LOADING TOW DOLLY

(76) Inventor: Curtis C. Hassell, Medford, OR (US)

(*) Notice: Subject to any disclaimer, the term of this patent is extended or adjusted under 35 U.S.C. 154(b) by 1040 days.

This patent is subject to a terminal disclaimer.

(21) Appl. No.: 12/495,214

(22) Filed: Jun. 30, 2009

Related U.S. Application Data

(63) Continuation-in-part of application No. 11/590,130, filed on Oct. 30, 2006, now Pat. No. 7,673,887.

(60) Provisional application No. 60/838,568, filed on Aug. 17, 2006.

(51) Int. Cl.
*B62D 61/12* (2006.01)

(52) U.S. Cl.
USPC ........................ 280/43.21; 280/79.4

(58) Field of Classification Search
USPC .............. 280/79.4, 43, 43.21, 43.17, 402; 414/426, 427, 429, 430; 254/3 R, 3 C, 254/8 R, 9 C See application file for complete search history.

(56) References Cited

U.S. PATENT DOCUMENTS

| | | | | |
|---|---|---|---|---|
| 2,380,415 | A * | 7/1945 | Carruthers | 414/429 |
| 4,781,419 | A * | 11/1988 | Boothe | 301/108.3 |
| 4,846,484 | A * | 7/1989 | Nekola | 280/43.11 |
| 5,988,974 | A * | 11/1999 | Zackovich | 414/563 |
| 6,041,584 | A * | 3/2000 | Hohnl | 56/17.2 |
| 7,097,406 | B1 * | 8/2006 | Gang | 414/429 |
| 7,275,753 | B1 * | 10/2007 | Ceccarelli et al. | 280/79.4 |
| 7,815,201 | B2 * | 10/2010 | Ceccarelli et al. | 280/79.4 |

* cited by examiner

*Primary Examiner* — Frank Vanaman
(74) *Attorney, Agent, or Firm* — Jerry Haynes Law

(57) ABSTRACT

A self-loading tow dolly that permits components of the dolly to be easily removed and replaced. The tow dolly also reduces overall weight by using aluminum slotted hubs mated with 8-inch aluminum slotted wheels and by employing dissimilar materials that do not require welding and improves lubrication by providing strategically placed lubricant ports and lubricant reservoirs for rotating components.

20 Claims, 10 Drawing Sheets

SELF-LOADING TOW DOLLY

CROSS-REFERENCE TO RELATED APPLICATIONS

The present patent application is related to and claims the benefit of priority from U.S. Provisional Patent Application No. 60/838,568, filed on 17 Aug. 2006, entitled "Self-Loading Tow Dolly," and is a continuation in part of U.S. Ser. No. 11/590,130, filed on Oct. 30, 2006, entitled "Self-Loading Tow Dolly" both of which are hereby incorporated by reference in their entirety.

FIELD OF THE INVENTION

My invention relates to self-loading tow dollies, and particularly to self-loading tow dollies that are hand carried from and to a tow truck where weight is a key factor in eliminating operator back and other injuries.

BACKGROUND OF THE INVENTION

My invention improves upon currently available self-loading tow dollies by permitting dolly components to be replaced without requiring cutting or welding. It also improves upon currently available self-loading tow dollies by reducing the overall weight of a tow dolly and by preventing rotational component seizures through improved lubricant coverage within rotating components.

Tow truck operators commonly use self-loading tow dollies. When a tow truck tows a vehicle it lifts one end of the vehicle. To prevent damage to the towed vehicle, for example, a four wheel drive vehicle that is stuck in gear, tow truck operators use tow dollies to lift the opposite end of the towed vehicle so that the dolly's wheels contact the road instead of the towed vehicle's wheels. Removing all of the towed vehicle's wheels from the ground greatly diminishes the possibility of damage to the towed vehicle.

Those skilled in the art know that tow dollies for raising pairs of coaxial vehicle wheels typically employ a pair of frame-like bases for supporting pairs of dolly wheels. Such dolly bases are placed outside two vehicle wheels to be lifted or elevated; the two bases being cross connected by parallel spaced tubular axles which are typically longitudinally adjustable to accommodate variations in vehicle wheel lateral spacing. Suitable mechanisms are provided for positioning the dolly wheels between a lowered position and a raised towing position which serves to elevate the towed vehicle prior to the actual towing operation. Suitable locking devices are provided for maintaining dolly wheels in desired elevated or lowered positions for storing or towing operations, respectively. Other known mechanisms without separate ratchet systems are employed for maintaining dolly wheels in elevated positions. U.S. Pat. No. 5,941,675 to Orr, fully incorporated herein by reference, shows and describes an exemplary tow dolly.

Tow dollies of the type described in U.S. Pat. No. 5,941,675 typically have several sections which are disengageable from one another for easy storage and transport of the tow dolly. For example, there are often two frame-like wheel assemblies where the dolly's wheels are mounted on spindle assemblies which are attached to the frame-like wheel assemblies. Brackets on the frame-like wheel assemblies accommodate axles that engage the wheels of the vehicle to be towed.

Tow dollies must have sturdy components that articulate in a manner when a car is lifted off the ground in just a few moments. Spindle assemblies are typically made of steel as are the brackets where the steel rail ends of the axles are fitted to complete assembly. This "steel on steel" construction permits steel dolly components to be welded together and has proved to be sturdy in the field. Over a period spanning more than thirty years the steel self-loading tow dolly has become the industry standard. Using all steel components and welding steel components together on the dolly frame results, however, in a heavy tow dolly that an operator must carry from the tow truck to the towed vehicle. Even when disassembled, the pieces of current tow dollies are heavy and cause strain on tow truck operators which may lead to back injuries and other health problems.

When tow truck operators hand carry self-loading tow dollies from and to a tow truck, weight is a key factor in eliminating back and other injuries. All steel constructed tow dollies are sturdy, but weight continues to be an issue. Thus, the need remains for an improved self-loading tow dolly configuration that is not only sturdy, but has the added benefit of weight reduction. It is an object of my invention to provide a self-loading tow dolly that solves this problem.

Because currently available self-loading tow dollies are welded together it is not possible for a tow truck operator to easily replace or fix a tow dolly that becomes damaged. Should a current tow dolly run against a curb and bend a spindle of one of the dolly's wheels the spindle assembly must be cut from the dolly and a new one welded in place. Because these cutting and welding operations require the use of metal working equipment that a tow truck operator typically does not have, the repair has to be done by a welding shop, which is time consuming and expensive. There is thus a need for self-loading tow dollies having modular components that can be replaced without resorting to a torch, saw, plasma cutter, and welder. This is particularly true in emergency situations such as emergency tows and for clearing wreckage from a jammed freeway. Thus, the need remains for an improved self-loading tow dolly configuration that is not only sturdy and lightweight, but also has modular components that can be readily replaced. Accordingly, it is a further object of my invention to provide a self-loading tow dolly that solves these problems.

Currently available self-loading tow dollies have rotating parts that require lubrication to reduce wear. For example, U.S. Pat. No. 5,941,675 to Orr shows grease fittings, 46 and 53 in FIG. 8, used to introduce a thin film of grease about pins 42 and 51. Because there is no lubrication reservoir for grease near or about pins 42 and 51 grease does not coat the entire bearing surface and is hence subject to moisture and rust causing component to seize up. There is thus a need for a self-loading tow dolly that accepts a 360 degree lubrication application to its rotating components. It is another object of my invention to provide a self-loading tow dolly that solves this problem.

BRIEF SUMMARY OF THE INVENTION

There is a need for a self-loading tow dolly capable of easy component replacement. There is also a need for a self-loading tow dolly with a reduced weight. There is a further need for a self-loading tow dolly to expand and contract in order to lift vehicles with tires ranging from small to large in diameter. Additionally, there is a need for a self-loading tow dolly with a more efficient lubrication system.

These needs and others are met by embodiments of my invention, which provide a self-loading tow dolly with detachable components. A self-loading tow dolly provides at least two wheels configured to rotate about a spindle, wherein each wheel rotates about its own spindle. I include structure that releasably attaches each spindle to a support bar in a manner that permits each wheel to move to and from a towed vehicle lowered position and a towed vehicle lifted position. There is at least a bracket attached to each support bar in which there is a parallel spaced tubular axle releasably attached through holes in the bracket, wherein I configure the brackets to receive axles and maintain the axles substantially parallel to one another and substantially perpendicular to the support bars. I attach a lift mechanism to at least one of the support bars and configure it to move at least one of the wheels to and from the towed vehicle lowered position and the towed vehicle lifted position. I attach a pawl mechanism to at least one of the support bars, which permits the lift mechanism to ratchet the support bar to the towed vehicle lifted position. I attach a release mechanism releasably to at least one of the support bars, and configure the release mechanism to permit at least one of the wheels to move from the towed vehicle lowered position to the towed vehicle lifted position for towing, and then from the towed vehicle lifted position to the towed vehicle lowered position for stowage. I also attach a locking mechanism releasably to at least one of the support bars and configure it to engage the release lever to hold at least one of the wheels in the towed vehicle lifted position.

Embodiments of my invention overcome the difficulty of replacing welded rotating components. My invention accomplishes this by a self-loading tow dolly constructed with rotating components that easily unbolt and bolt together instead of requiring cutting and welding.

Embodiments of the present invention also overcome the problem of excessive weight as well as enhance the lubrication of self-loading tow dollies. My invention is constructed to take advantage of weight savings by using various materials with different strength to weight characteristics than steel. Other embodiments of my invention also provide a lubricant reservoir contained within rotating parts. By including a lubricant reservoir in my invention, I ensure that 360 degrees of the bearing surface of the load-bearing, rotating components are coated with lubrication.

I will set forth additional advantages and novel features of my invention in part by the description that follows, and in part it will be apparent to those skilled in the art upon examination of the following or may be learned by practicing my invention. The following description is illustrative in nature and does not limit the present invention to embodiments described. The advantages of my invention may be realized and attained by the instrumentalities and combinations, particularly pointed out in the appended claims, which define my invention.

BRIEF DESCRIPTION OF THE DRAWINGS

I illustrate my invention by way of example, and not by way of limitation in the figures of the accompanying drawings in which like reference numerals refer to similar elements and in which.

DETAILED DESCRIPTION

My invention addresses and solves problems related to self-loading tow dollies, particularly where current dollies do not permit simple, easy component replacement. It also addresses and solves problems related to providing a lightweight dolly and problems related to lubricating rotating components.

My invention solves the above problems by providing a self-loading tow dolly as discussed below. One of ordinary skill in the art will realize that the following discussion is illustrative and intended to describe preferred embodiments of the present invention and is not intended to limit my invention to the embodiments discussed. My invention has numerous applications where a tow dolly is used to raise and transport a heavy object. It may be scaled and adapted to many applications and is defined by the claims, which set forth the metes and bounds of my invention.

Figure 1:
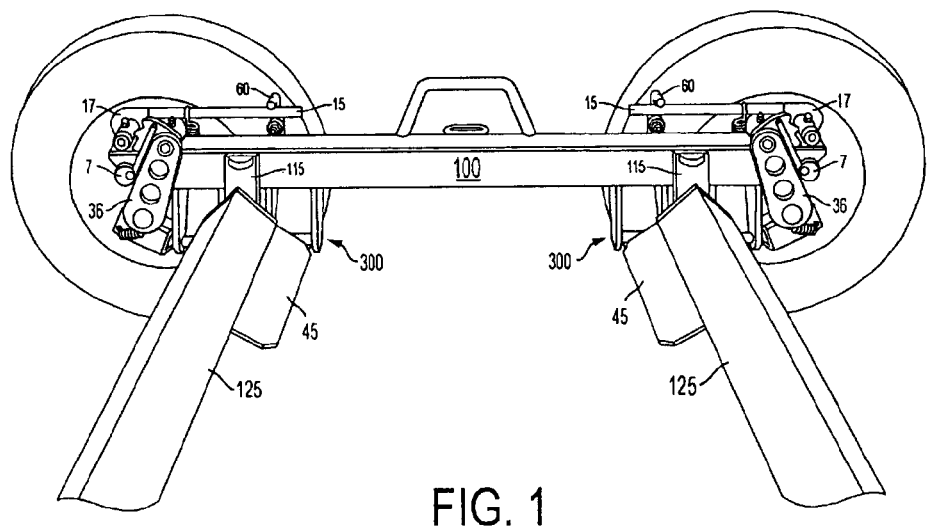
FIG. 1 is a rear perspective view of an embodiment of the invention depicting the dolly structure in a towed vehicle lifted position with ratchet assemblies engaged to ratchet gears and safety locks engaged to release assemblies and with parallel spaced tubular axles attached to axle support brackets.
Figure 1A:
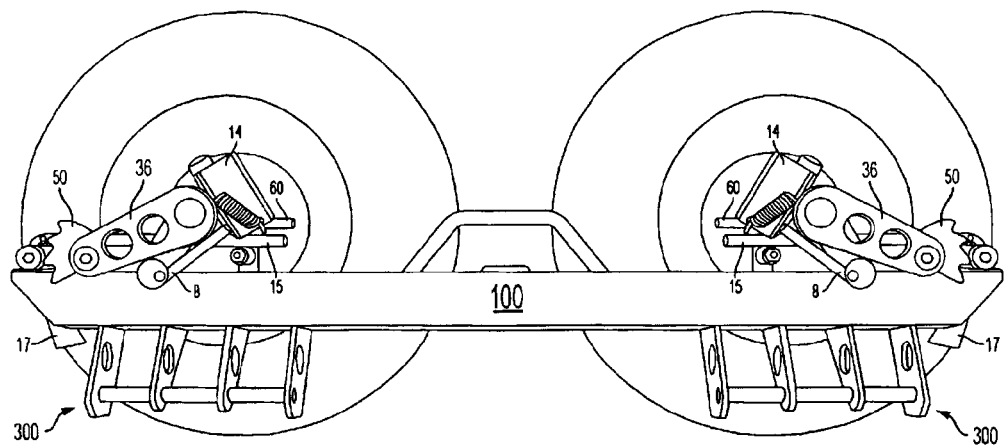
FIG. 1a is a rear perspective view of an embodiment of the invention depicting the dolly structure in a towed vehicle lowered position with ratchet assemblies disengaged from ratchet gears and safety locks disengaged from release assemblies.
Figure 1B:
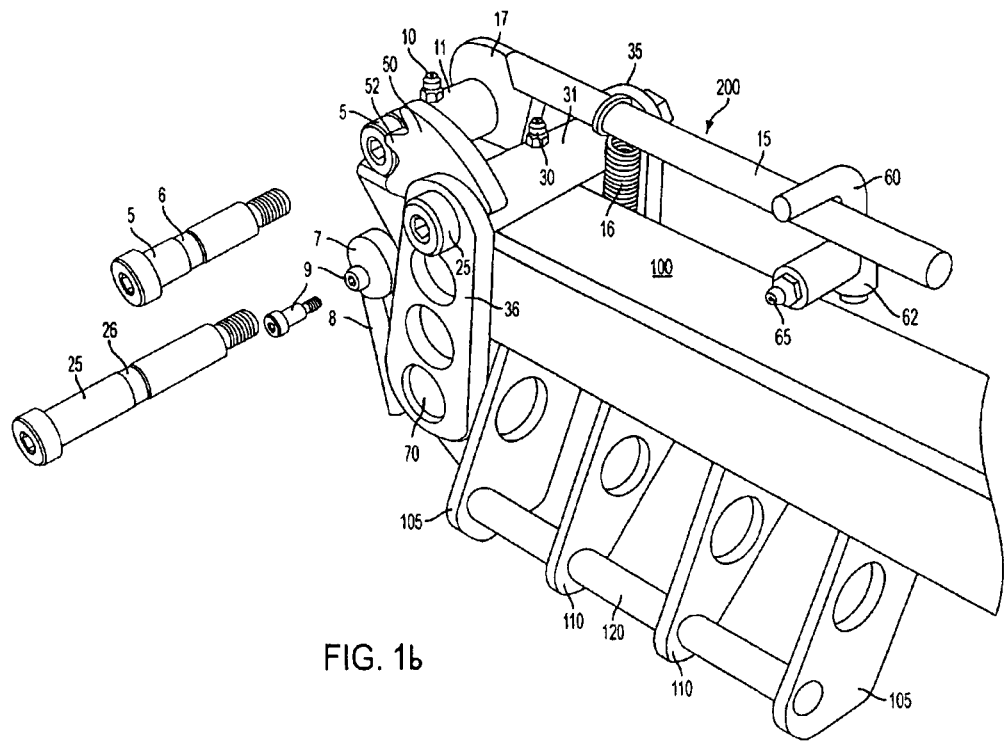
FIG. 1b is a rear left-side perspective view of an embodiment of the invention depicting the dolly structure in a towed vehicle lifted position.

Referring now to the drawings, and initially to FIG. 1b, I describe an improved self-loading tow dolly. A support base 200 provides support for a pair of dolly wheels (not shown for clarity). Support base 200 comprises a support bar 100. To reduce the overall weight of the self-loading tow dolly according to the present invention support bar 100 is made from a strong, lightweight material such as aircraft grade aluminum, a carbon fiber reinforced metal such as aluminum or steel containing a carbon fiber matrix or a carbon fiber and resin material similar to materials used for aircraft construction. In alternative embodiments support bar 100 is made from steel and overall tow dolly weight savings are realized elsewhere.

I attach a tubular member 31 rigidly to support bar 100. Tubular member 31 may be positioned to the outside of support bar 100 as is depicted in FIG. 1b. In embodiments where support bar 100 is made from a metal, I optionally weld tubular member 31 to support bar 100. In embodiments where support bar 100 is a carbon composite without metal, I affix tubular member using adhesives as is well known in aircraft construction. Tubular member 31 has a first aperture extending longitudinally through tubular member 31 and a second aperture extending transversally through the tube wall. The second aperture contains a lubrication port, such as a zerk fitting for example.

Figure 2:
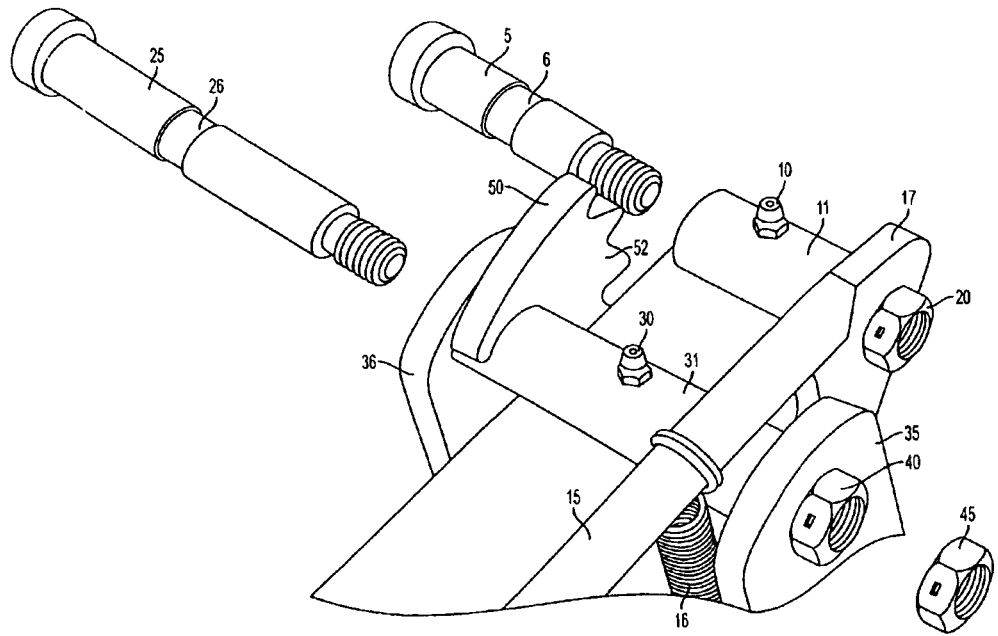
FIG. 2 is a top assembly view of the embodiment of FIG. 1b depicting the dolly structure in a towed vehicle lifted position and lubricant reservoirs.

I position spindle plates 35 and 36 adjacent each end of tubular member 31 and hold them in place by bolt 25. Bolt 25 rotatingly, releasably secures spindle plates 35 and 36 to tubular member 31 using locking nuts 40 and 45 (FIG. 2). I use two locking nuts 40 and 45 to secure bolt 25 in place in the preferred embodiment, however other locking mechanisms, for example, a lock nut containing a deformable insert or a castle nut held in place by a cotter pin through a hole in the end of bolt 25, are within the scope of my invention. In the preferred embodiment of my invention, I make plates 35 and 36 from steel. I attach spindle 70 rigidly to spindle plates 35 and 36, for example by welding. Spindle 70 forms the central axis for one of the tow dolly's wheels (not depicted for clarity). As used in this description of the inventive self-loading tow dolly, those skilled in the art will understand that a spindle is to be the part of an axle on which a dolly wheel turns. I attach gear plate 50 rigidly to tubular member 31 and to support bar 100, for example by welding.

Bolt 5 passes through tubular member 11 which I attach to support bar 100 in the same manner as tubular member 31. Tubular member 11 also has a first aperture extending through the longitudinal axis of tubular member 11, and a second aperture extending transversally through a wall of tubular member 11. As with tubular member 31, the second aperture contains a lubrication port 10, such as a zerk fitting for example. Bolt 5 rotatingly affixes a release plate 17 to tubular member 11. I use a locking nut 20 (FIG. 2) to hold bolt 5 and release plate 17 in place. In the preferred embodiment, I configure bolt 5 to rotate with release plate 17 without loosening locking nut 20 (FIG. 2).

Figure 4:
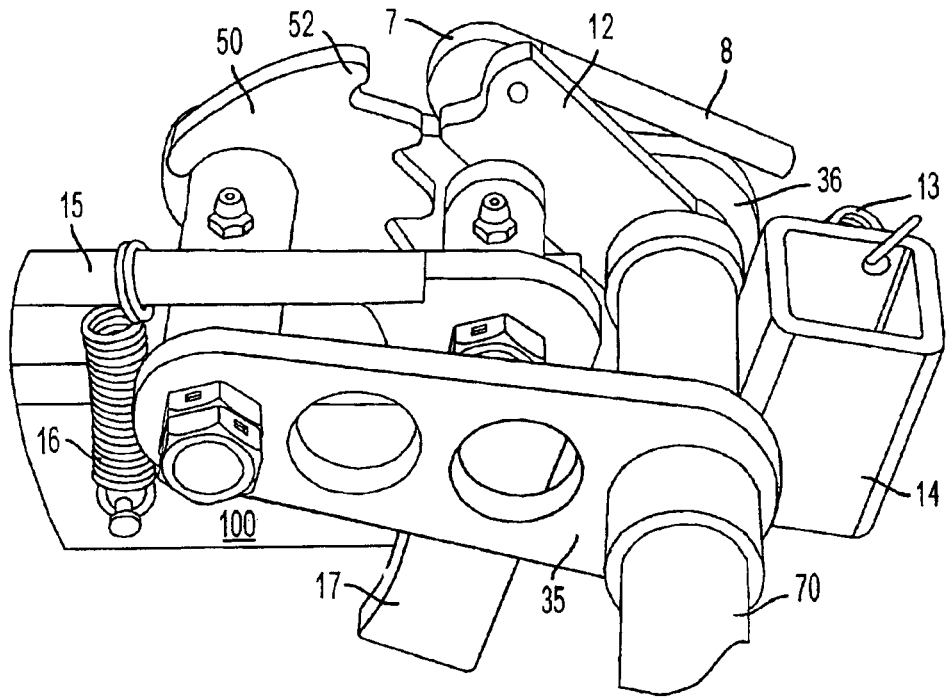
FIG. 4 is a front perspective view of an embodiment of the invention depicting ratchet mechanism disengaged from gear assembly.
Figure 5:
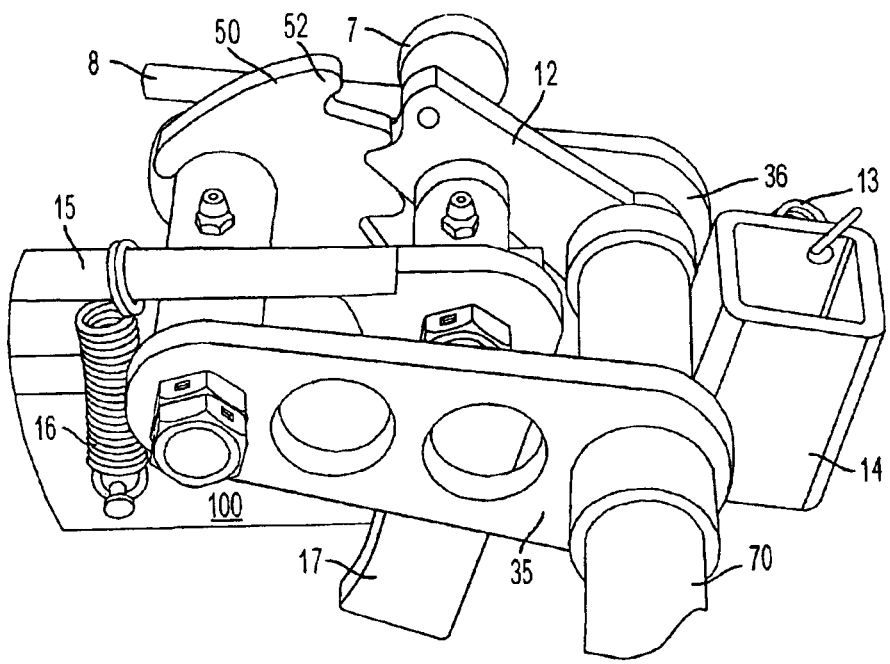
FIG. 5 is a front perspective view of an embodiment of the invention depicting ratchet mechanism engaged into gear assembly.

Release lever 15 is rigidly attached to release plate 17 for example by welding. I attach a spring 16 to release lever 15 in order to provide tension on release lever 15, thus holding release plate 17 in a position that prevents spindle 70 from disengaging from bottom of release plate 17. I attach spring 16 to support bar 100 as shown in FIGS. 4 and 5. I also attach a safety lever support 62 to support bar 100, for example through a threaded engagement, by welding or using an adhesive. Safety lever support 62 has a lubrication port 65 that communicates lubricants from outside the safety lever support 62 to the rotating internal structure within safety lever support 62. I mount safety lever 60 rotatably within safety lever support 62 so that it can be rotated to a first position utilizing a ball detent system, where it prevents release lever 15 from rotating about tubular member 11. Safety lever 60 also has a second position (not shown) where it allows release lever 15 to rotate release plate 17 about tubular member 11 thus permitting spindle 70 to disengage from bottom of release plate 17 and thus lowering support bar 100 to a towed vehicle lowered position.

By constructing embodiments of my invention as described in relation to FIG. 1, it provides a self-loading tow dolly with modular components that can easily be replaced without cutting through metal and without welding. Simply removing bolt 5 permits release plate 17 and release lever 15 to be quickly replaced. Likewise, when I remove bolt 25, I can easily and quickly replace the wheel spindle assembly (plates 35, 36 and spindle 70). Thus, when a wheel bearing seizes on a spindle 70, the spindle assembly can easily be replaced on the spot without having to take the inventive tow dolly into a metal working shop for an undetermined amount of downtime and expensive repairs.

Referring to FIG. 2, I now show an embodiment of my invention providing lubricant reservoirs. Bolts 5 and 25 have grooves 6 and 26, respectively, machined into them. Grooves 6 and 26 act as lubricant reservoirs when bolts 5 and 25 are inserted into tubular members 11 and 31, respectively. I align the grooves 6 and 26 with the transverse apertures containing lubricant ports 10 and 30, respectively so that I can communicate lubricant introduced into lubricant ports 10 and 30 into grooves 6 and 26, respectively. Lubricant introduced into grooves 6 and 26 flows 360 degrees around the bearing surfaces of each rotatable component, thus alleviating seizure problems. Thus, embodiments of my invention provide increased efficiency in supplying lubricant to rotating components while permitting an operator to intermittently inject lubricant into the rotating components.

Figure 2A:
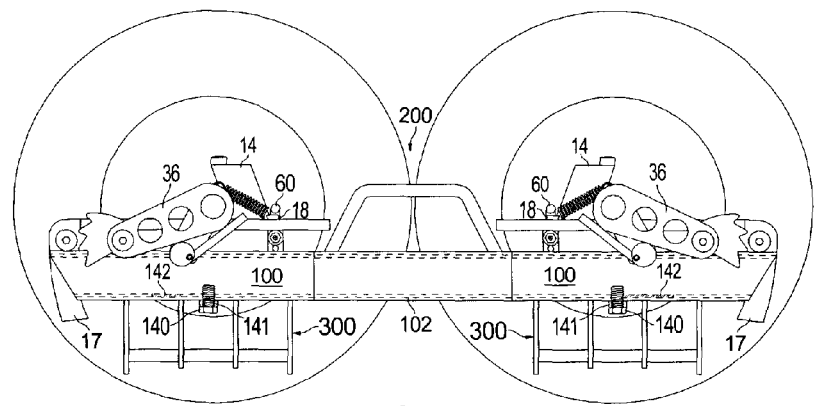
FIG. 2a is a rear perspective view of an embodiment of the invention depicting the dolly structure in a lowered stowed position with outer telescopic support bar retracted, ratchet assemblies disengaged from ratchet gears, and safety locks engaged to release assemblies and to spindle assembly tabs.
Figure 2B:
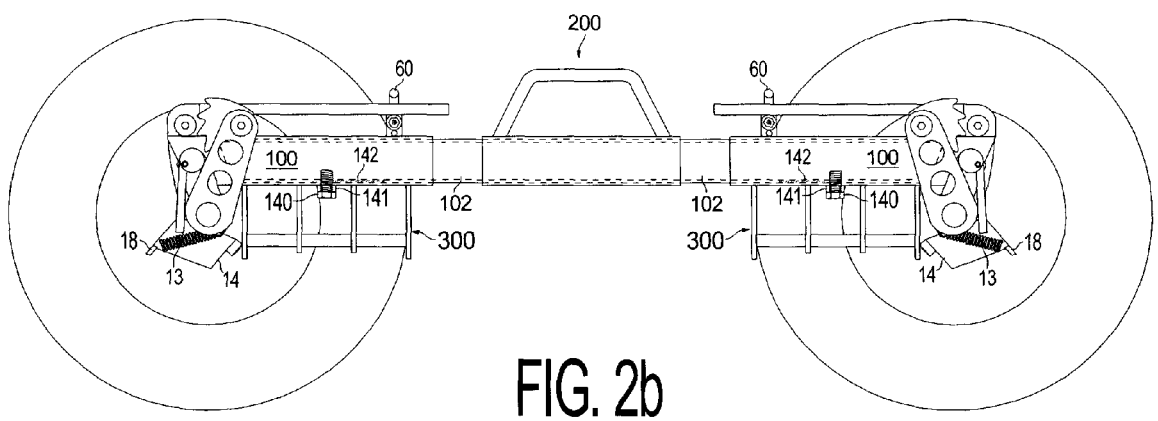
FIG. 2b is a rear perspective view of an embodiment of the invention depicting the dolly structure in a towed vehicle lifted position with outer telescopic support bar extended, ratchet assemblies engaged to ratchet gears, and safety locks engaged to release assemblies.

Referring now to FIG. 2a, I describe a further improved self-loading tow dolly. A telescoping support base 200 provides support for a pair of dolly wheels. Support base 200 comprises an inner support bar 102 on which support bars 100 slide from a retracted position for compact storage to an extended position for towing vehicles with large tires. Support bar 100 and support bar 102 may be made of dissimilar materials such as aluminum or high-tensile steel, to reduce weight. I attach nut 141 rigidly to support bar 100 for example by welding. Bolt 140 releasably secures support bar 100 to inner support bar 102 through nut 141 and slotted opening 142 in bottom of inner support bar 102. FIG. 2a shows dolly in retracted lowered position while FIG. 2b depicts dolly in extended towed vehicle lifted position.

Figure 3:
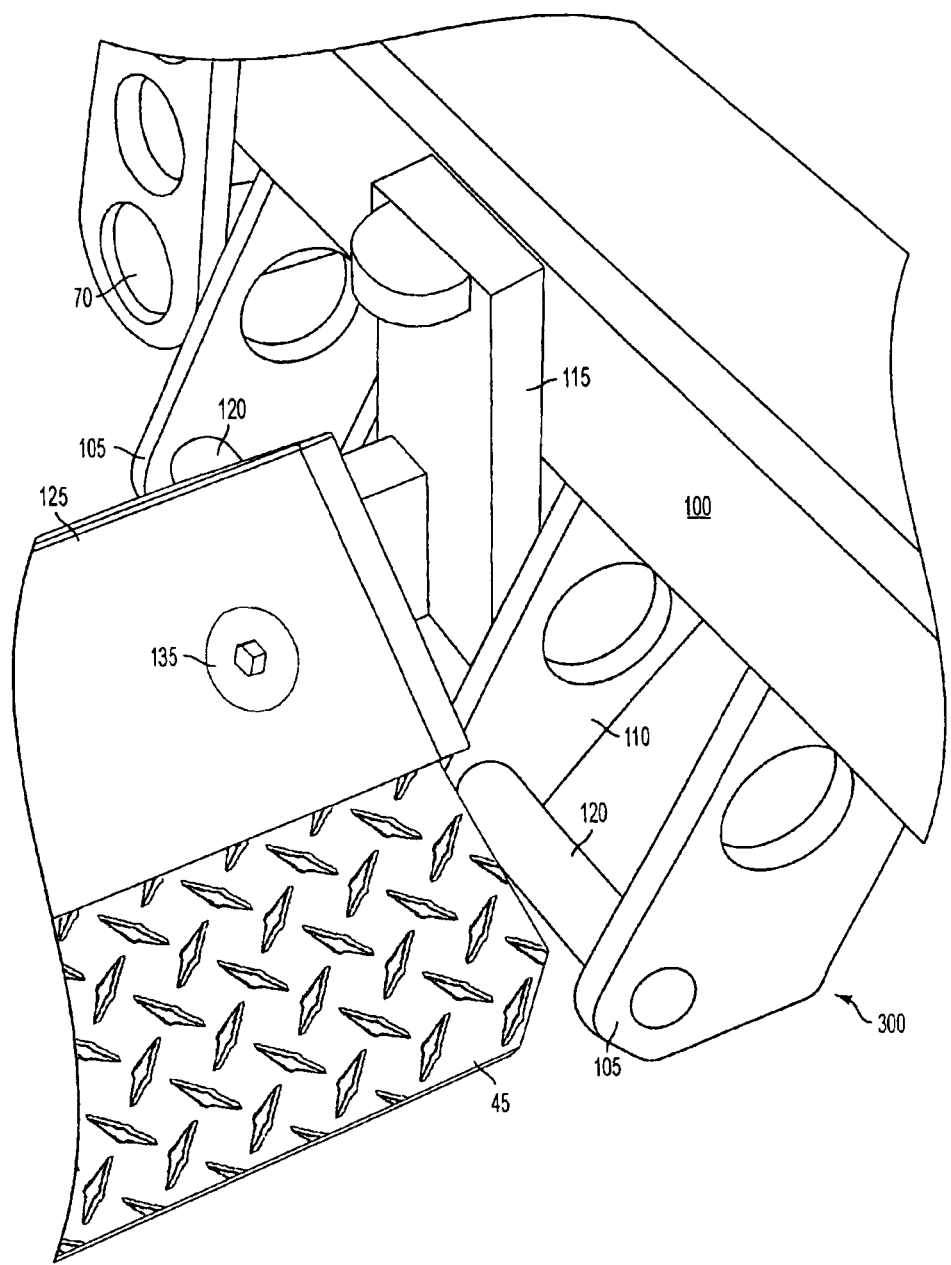
FIG. 3 is a left perspective view of the embodiment of FIG. 1b depicting lightweight construction with parallel spaced tubular axle inserted in bracket.

Referring to FIG. 3, I describe a bracket made of dissimilar materials. I compose bracket 300 of trusses 105 and 110 that I attach to support bar 100. I attach trusses 105 and 110 rigidly to support bar 100, for example by welding. I can make trusses 105 and 100 out of lightweight materials that have high tensile strengths, such as aluminum when support bar 100 is also made from aluminum, or other materials as described above. Trusses 105 and 110 must be able to withstand high tensile forces, but do not need to be strong in compression as there is never a compressive load placed upon them. Accordingly, I can use materials lighter in weight than steel presently used for trusses 105 and 110.

Continuing to refer to FIG. 3, I insert steel axle end piece 115 into the end of parallel spaced aluminum axle tube 125, with thin plastic shim (not shown) to insulate aluminum from steel contact. I secure axle end piece 115 to parallel spaced aluminum axle tube 125 with fastener 135. I rigidly attach tread plate 145 to aluminum axle tube 125 for example by welding. I place steel end piece 115 on support bar 120 to secure parallel spaced axles to dollies.

I insert an axle support bar 120 through apertures in the trusses 105 and 110, thus permitting me to make the axle support bar 120 from a dissimilar material, such as steel or other hard, durable material with a high compressive strength. Support bar 120 can also be configured as a replaceable bolt of high tensile strength, to pass through apertures in the trusses 105 and 110. A bracket made according to embodiments of my invention thus provides further weight reduction for the inventive self-loading tow dolly.

Figure 5A:
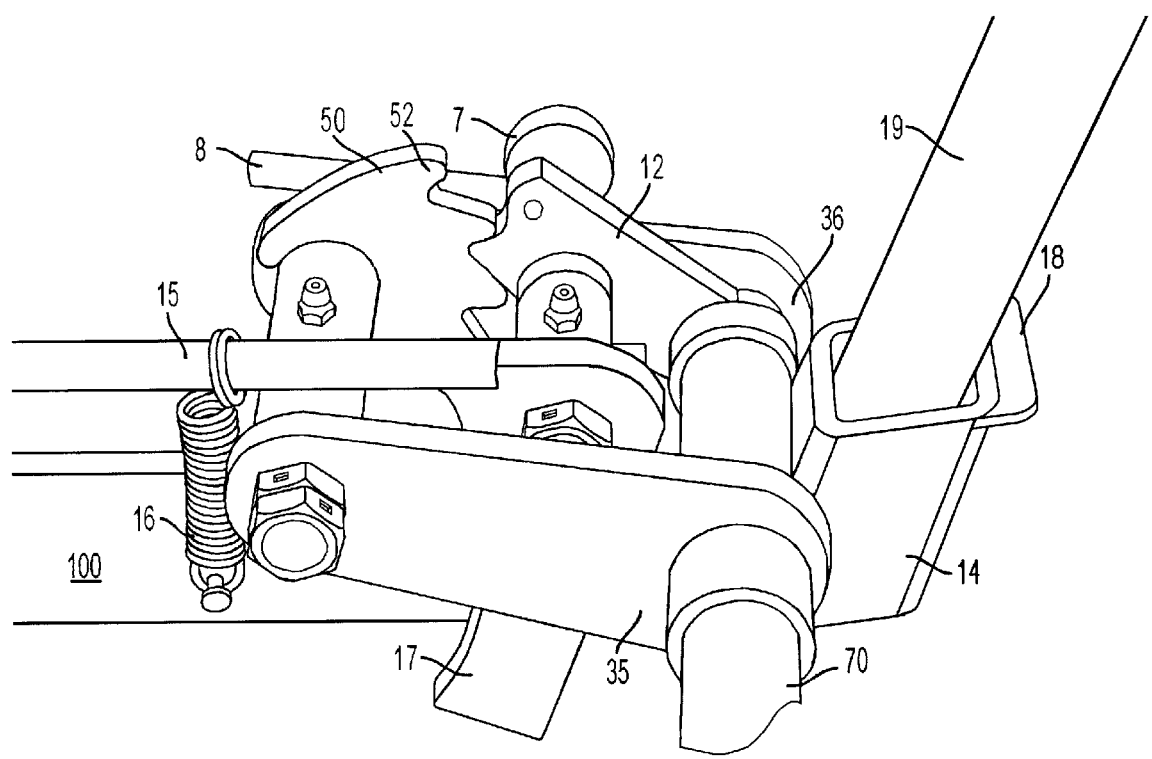
FIG. 5a is a front perspective view of an embodiment of the invention depicting ratchet mechanism engaged into gear assembly and pry bar inserted into pry pocket with spindle assembly tab attached to pry pocket.

Referring to FIGS. 1b, 4, 5 and 5a, I now further describe operation of the invention. I attach pry pocket 14 rigidly to spindle 70. In FIG. 5a, I also attach spindle assembly tab 18 perpendicularly to outside of open end of pry pocket 14, for example by welding, thus strengthening the wall of pry pocket 14 from bowing under pressure from pry bar 19 while lifting vehicle. I also attach ratchet handle 8 rigidly to ratchet cam 7, for example by welding. As depicted in FIG. 1b, I insert fastener 9 through an off-center hole in cam 7 into ratchet plate 12. I attach spring 13 from bottom of ratchet plate 12 to pry pocket 14, thus securing ratchet plate 12 to spindle 70 and spindle plate 36. FIG. 4 illustrates the invention in a disengaged release position where ratchet plate 12 is disengaged from gear plate 50. When I move ratchet handle 8 from the position shown in FIG. 4 to the position shown in FIG. 5, ratchet cam 7 is rotated allowing ratchet plate 12 to engage gear teeth 52 on gear plate 50. When I insert pry bar 19 into pry pocket 14 as shown in FIG. 5a, and move the tow dolly wheels, for example as described in U.S. Pat. No. 5,941,675 to Orr, ratchet plate 12 engages with ratchet gear plate 50 as depicted in FIG. 5. Ratchet gear plate 50 and ratchet plate 12 interact with spindle 70 to hold the tow dolly wheels in a towed vehicle lifted position in case release plate 17 unexpectedly disengages from spindle 70.

Figure 6A:
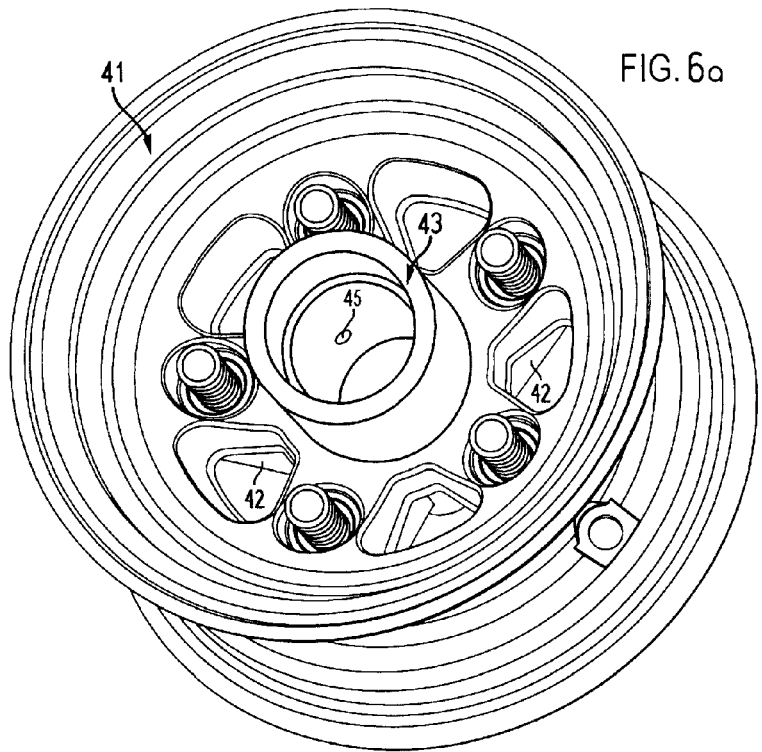
FIG. 6a is a front perspective view of an embodiment of the invention depicting lightweight construction of the wheel and the hub, hub lubrication port, flow-through ventilation through both the wheel and hub slotted openings, and the hub rear reinforcing gussets.
Figure 6B:
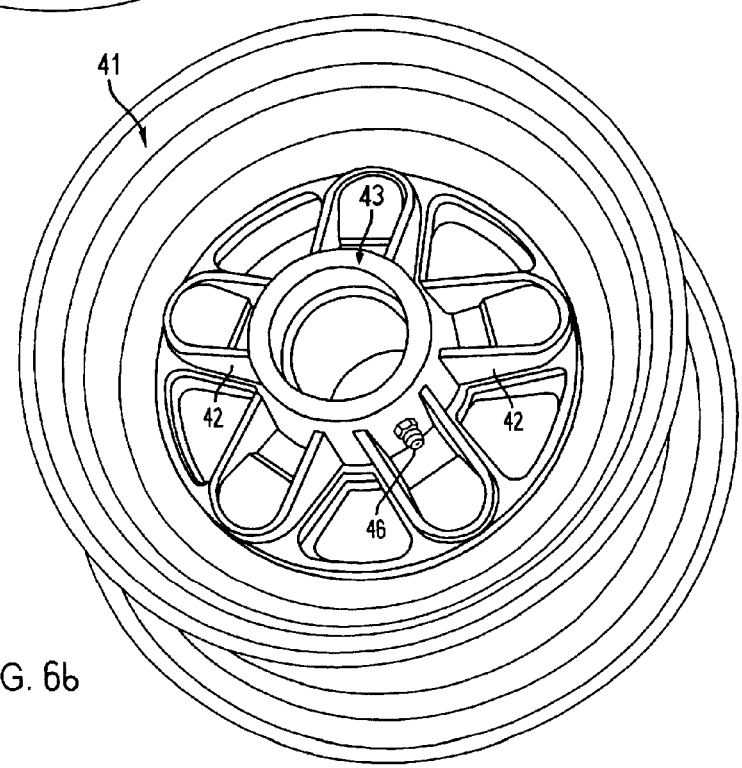
FIG. 6b is a rear perspective view of an embodiment of the invention depicting lightweight construction of the wheel and the hub, flow-through ventilation through both the wheel and hub slotted openings, the rear reinforcing gussets, and hub grease fitting.
Figure 6C:
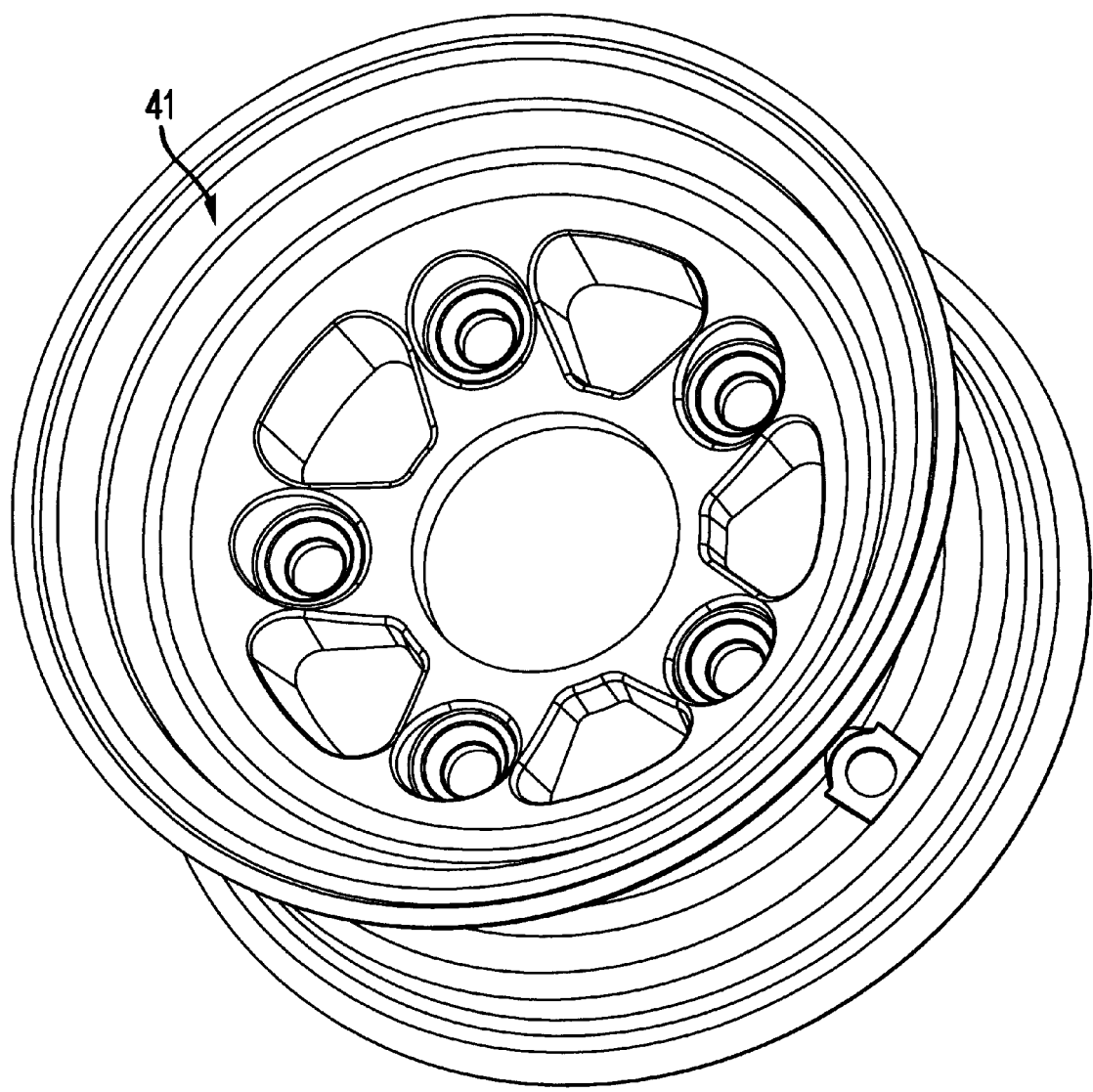
FIG. 6c is a front perspective view of an embodiment of the invention depicting the wheel separated from the hub.

Referring to FIGS. 6a, 6b, and 6c, I now describe a further weight reducing component for my inventive tow dolly. I reduce its weight by using slotted 8 inch aluminum wheels 41 that are mated with slotted aluminum hubs 43. Flow-though ventilation, through slotted openings helps facilitate cooling of hub and wheel. I fit hub 43 with centrally located lubrication port 45, such as zerk fitting 46, The advantage of centrally placing a lubrication port through aperture 45 is that lubricant is forced out equally from the middle of the hub through the inner and outer bearings. In currently available systems, such as the Bearing Buddy®, lubricant is forced into the bearings from the front of the hub and must flow to the rear of the bearings resulting in uneven lubrication for the bearings.

Figure 7A:
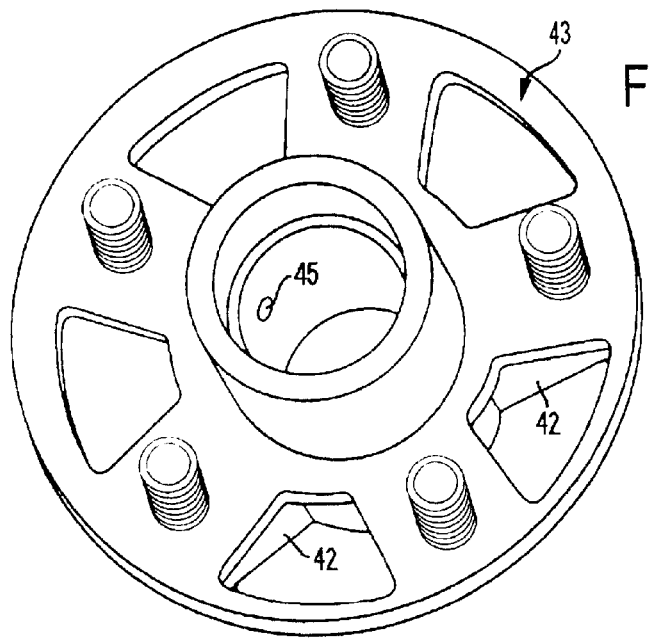
FIG. 7a is a front perspective view of an embodiment of the invention depicting the hub separated from the wheel, hub lubrication port, and hub rear reinforcing gussets.
Figure 7B:
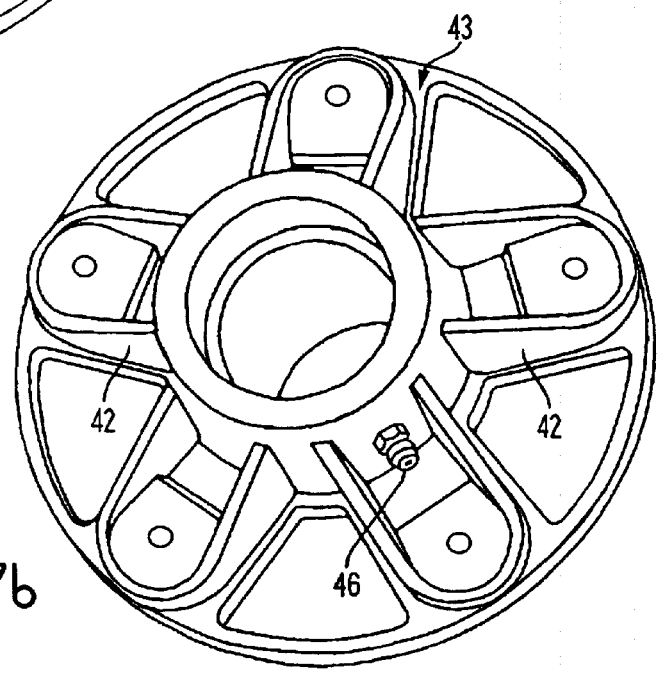
FIG. 7b is a rear perspective view of an embodiment of the invention depicting the hub separated from the wheel, hub rear reinforcing gussets, and hub grease fitting.

Referring now to FIGS. 7a and 7b, hub 43 is separated from wheel 41 with lubrication port 45 and reinforcing gussets 42. Aluminum hub 43 is cast with reinforcing gussets 42 on the back of hub 43. Gussets 42 double as cooling means, to help draw away excess heat while hub and wheel are in motion.

Figure 8:
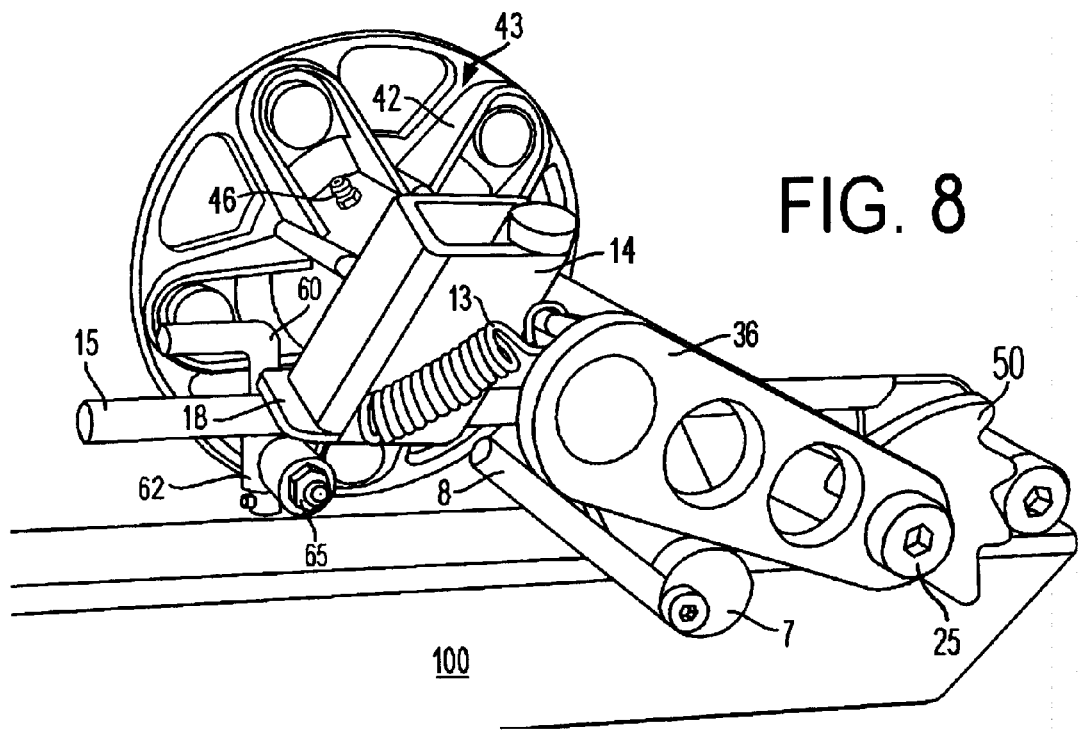
FIG. 8 is a rear right-side perspective view of an embodiment of the invention depicting the dolly structure in a towed vehicle lowered position with safety locks disengaged from release assemblies and from spindle assembly tabs.
Figure 8A:
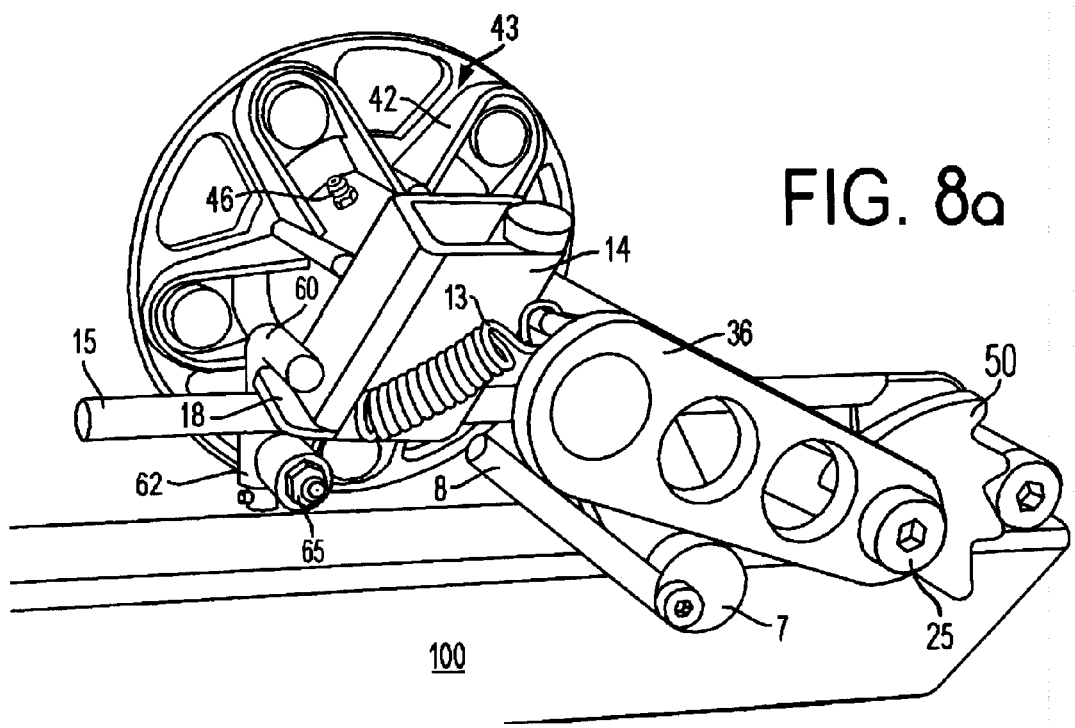
FIG. 8a is a rear right-side perspective view of an embodiment of the invention depicting the dolly structure in a towed vehicle lowered position with safety locks engaged to release assemblies and to spindle assembly tabs.

Referring to FIGS. 8 and 8a, I describe the locking mechanism of safety lever 60 shown in the unlocked position. By rotating safety lever 60 over spindle assembly tab 18, spindle assembly is secured in place while dolly is in the stowed lowered position.

While I have described my invention in connection with what I presently consider to be the most practical and preferred embodiment, it is to be understood that my invention is not limited to the described embodiments, but, on the contrary, I intend it to cover various modifications and equivalent arrangements included within the scope of the appended claims.

I claim:

1. A self-loading tow dolly comprising:
   at least two wheels configured to rotate about a spindle, wherein each wheel rotates about its own spindle;
   structure that releasably attaches each spindle to at least one telescoping support bar in a manner that permits each wheel to move to and from a towed vehicle lowered position and a towed vehicle lifted position, the telescopic support bar comprises an inner support bar having a fixed length and an outer support bar slideably engaged with the inner support bar in a manner that permits the telescoping support bar to be extended and retracted, wherein the structure for releasably attaching each spindle to at least one telescoping support bar further comprises:
   a first plate containing at least a first aperture and a second aperture;
   a second plate containing at least a first aperture and a second aperture;
   the first aperture on the first plate and the first aperture on the second plate are sized to receive the spindle and the spindle is rigidly attached to the first and second plates; and
   the second aperture on the first plate and the second aperture on the second plate are sized to receive a fastening member which rotatably, releasably attaches each plate to the telescoping support bar;
   a tubular member rigidly attached to the at least one telescoping support bar and configured to receive the fastening member which rotatably, releasably attaches each plate to the at least one telescoping support bar;
   at least a bracket rigidly attached to the at least one telescoping support bar wherein the bracket is configured to receive axles and maintain the axles substantially parallel to one another and substantially perpendicular to the at least onetelescoping support bar;
   a lift mechanism attached to the at least one telescoping support bar and configured to move at least one of the wheels from the towed vehicle lowered position to the towed vehicle lifted position;
   a ratchet mechanism releasably attached to at least one of the spindle assemblies; and
   a release mechanism releasably attached to the at least one telescoping support bar, the release mechanism configured to permit at least one of the wheels to move from the towed vehicle lifted position to the towed vehicle lowered position; and
   a locking mechanism releasably attached to the at least one telescoping support bar and configured to engage the release lever to hold at least one of the wheels in the towed vehicle lifted position.

2. The self-loading tow dolly according to claim 1, further comprising:
   an aperture in the tubular member configured to receive a lubrication port;
   a lubrication port contained within the aperture in the tubular member; and a lubrication reservoir formed integrally on the fastening member which rotatably, releasably attaches each plate to the at least one telescoping support bar, the lubrication reservoir configured to cooperate with the inner wall of the tubular member to retain lubricant about the fastening member which rotatably, releasably attaches each plate to the at least one telescoping support bar.

3. The self-loading tow dolly according to claim 1, wherein:
   each bracket rigidly attached to at least one the telescoping support bar comprises a series of trusses configured to receive an axle support bar;
   each truss is rigidly attached to the axle support bar; and
   each truss is constructed using the same material with as high a tensile strength as the axle support bar, to which it is rigidly attached; and
   the axle support bar is rigidly or releasably attached to a series of trusses; and
   the axle support bar is constructed using the same, or a different material as the trusses with a high compression strength.

4. The self-loading tow dolly according to claim 1, wherein:
   the release mechanism releasably attached to the at least one telescoping support bar and configured to engage a release assembly to hold at least one of the wheels in the towed vehicle lifted position is rigidly attached to the structure that releasably attaches each spindle to the telescoping support bar in a manner that permits each wheel to move to and from a towed vehicle lowered position and a towed vehicle lifted position; and further comprising
   a fastening member which rotatably, releasably attaches the release assembly to the telescoping support bar and is configured to rotate with the release assembly and to engage the mechanism that is releasably attached to the telescoping support bare to hold at least one of the wheels in the towed vehicle lifted position.

5. The self-loading tow dolly according to claim 4, further comprising:
   a tubular member rigidly attached to the telescoping support bar and configured to receive the fastening member which rotatably, releasably attaches the release mechanism to the telescoping support bar;
   an aperture in the tubular member configured to receive a lubrication port;
   a lubrication port contained within the aperture in the tubular member; and
   a lubrication reservoir formed integrally on the fastening member which rotatably, releasably attaches the release mechanism to the telescoping support bar, the lubrication reservoir configured to cooperate with the inner wall of the tubular member to retain lubricant about the fastening member which rotatably, releasably attaches the release mechanism to the telescoping support bar.

6. The self-loading tow dolly according to claim 1, further comprising a steel axle end piece inserted into an aluminum axle tube with a fastening means wherein the fastening means secures the steel axle end piece to the aluminum axle tube wherein the steel axle end piece is insulated from contact with the inside of the aluminum axle tube by a plastic shim.

7. The self-loading tow dolly according to claim 6 further comprising a tread plate secured to the axle tube.

8. The self-loading tow dolly according to claim 1, wherein the structure for engaging the tow dolly further comprises:
   a ratchet handle rigidly attached to a ratchet cam which in turn is attached to a ratchet plate;
   a ratchet assembly secured to the spindle; and
   a gear plate having gear teeth rigidly attached to the at least one telescoping support bar;
   wherein the ratchet assembly is engaged by moving the ratchet handle in a manner sufficient to allow the ratchet cam to rotate causing the ratchet plate to engage the gear teeth of the gear plate thereby causing the spindle assembly to interact with the gear plate to ratchet the tow dolly into a towed vehicle lifted position.

9. The self-loading tow dolly according to claim 1, wherein at least two wheels are slotted 8 inch aluminum wheels; and further comprising
   slotted aluminum hubs mating with the 8 inch slotted aluminum wheels, each hub configured with a centrally located aperture configured to receive a lubrication port; and
   a lubrication port contained within the centrally located aperture in the slotted aluminum hubs.

10. The self-loading tow dolly according to claim 1, wherein the tow dolly comprises perforated metal so as to reduce the weight of the dolly while maintaining structural integrity.

11. A self-loading tow dolly of claim 1 further comprising a safety mechanism comprising a safety lever and assembly tab, the safety lever rotatively attached to at least one of the support bars and configured to engage the assembly tab to hold the safety lever in place when the wheels are in the towed vehicle lifted position.

12. A self-loading tow dolly comprising:
   at least two wheels configured to rotate about a spindle, wherein each wheel rotates about its own spindle;
   structure that releasably attaches each spindle to a telescoping support bar in a manner that permits each wheel to move to and from a towed vehicle lowered position and a towed vehicle lifted position, the telescopic support bar comprises an inner support bar having a fixed length and an outer support bar slideably engaged with the inner support bar in a manner that permits the telescoping support bar to be extended and retracted;
   at least a bracket rigidly attached to the telescoping support bar wherein each bracket is configured to receive axles and maintain the axles substantially parallel to one another and substantially perpendicular to the telescoping support bars;
   a lift mechanism attached to the telescoping support bar and configured to move at least one of the wheels from the towed vehicle lowered position to the towed vehicle lifted position;
   a release lever releasably attached to the support bar, the release lever configured to permit at least one of the wheels to move from the towed vehicle lifted position to the towed vehicle lowered position;
   a mechanism releasably attached to the telescoping support bar and configured to engage the release lever to hold at least one of the wheels in the towed vehicle lifted position; and
   further comprising a safety mechanism comprising a safety lever and spindle assembly tab, the safety lever rotatively attached to at least one of the support bars and configured to engage the spindle assembly tab to hold the spindle assembly in place when the wheels are in the towed vehicle lowered position.

13. The self-loading tow dolly according to claim 12, wherein the structure for releasably attaching each spindle to a telescoping support bar further comprises:
   a first plate containing at least a first aperture and a second aperture;

a second plate containing at least a first aperture and a second aperture;

the first aperture on the first plate and the first aperture on the second plate are sized to receive the spindle and the spindle is rigidly attached to the first and second plates; and the second aperture on the first plate and the second aperture on the second plate are sized to receive a fastening member which rotatably, releasably attaches each plate to the telescoping support bar.

14. The self-loading tow dolly according to claim 12, wherein:

each bracket rigidly attached to each outer support bar comprises a series of trusses configured to receive an axle support bar;

each truss is rigidly attached to the outer support bar; and each truss is constructed using a material with a high tensile strength and the axle support bar is constructed using a different material with a high compression strength.

15. The self-loading tow dolly according to claim 12, wherein the mechanism releasably attached to the telescoping support bar and configured to engage the release lever to hold at least one of the wheels in the towed vehicle lifted position is rigidly attached to the structure that releasably attaches each spindle to a support bar in a manner that permits each wheel to move to and from a towed vehicle lowered position and a towed vehicle lifted position; and further comprising a fastening member which rotatably, releasably attaches the release lever to the support bar and is configured to rotate with the release lever and to interact with the mechanism that is releasably attached to at least one of the support bars and is configured to engage the release lever to hold at least one of the wheels in the towed vehicle lifted position.

16. The self-loading tow dolly according to claim 12, wherein the at least two wheels are slotted 8 inch aluminum wheels; and further comprising slotted aluminum hubs mating the 8 inch aluminum wheels, each hub configured with a centrally located aperture configured to receive a lubrication port; and a lubrication port contained within the centrally located aperture in the slotted aluminum hubs.

17. A self-loading tow dolly comprising:

at least two slotted 8 inch aluminum wheels, configured to rotate about a spindle, wherein each wheel rotates about its own spindle;

hubs mating the 8 inch aluminum slotted wheels;

structure that releasably attaches each spindle to at least one support bar in a manner that permits each wheel to move to and from a towed vehicle lowered position and a towed vehicle lifted position;

at least a bracket rigidly attached to each at least one support bar wherein each bracket is configured to receive axles and maintain the axles substantially parallel to one another and substantially perpendicular to each at least one support bar;

a lift mechanism attached to at least one of the support bars and configured to move at least one of the wheels from the towed vehicle lowered position to the towed vehicle lifted position;

a release mechanism, releasably attached to at least one of the support bars, the release mechanism configured to permit at least one of the wheels to move from the towed vehicle lifted position to the towed vehicle lowered position; and a locking mechanism releasably attached to at least one of the support bars and configured to engage the lift mechanism to hold at least one of the wheels in the towed vehicle lifted position;

wherein the support bar is a telescoping support bar and the structure releasably attaches each spindle to the telescoping support bar in a manner that permits each wheel to move to and from a towed vehicle lowered position and a towed vehicle lifted position, the telescopic support bar comprises an inner support bar having a fixed length and an outer support bar slideably engaged with the inner support bar in a manner that permits the telescoping support bar to be extended and retracted.

18. The self-loading tow dolly of claim 17 wherein each hub comprises:

a centrally located aperture configured to receive a lubrication port; and a lubrication port contained within the centrally located aperture in the slotted hubs.

19. A self-loading tow dolly comprising:

at least two slotted 8 inch aluminum wheels configured to rotate about a spindle, wherein each wheel rotates about its own spindle;

hubs mating with the 8 inch slotted aluminum wheels;

structure that releasably attaches each spindle to at least one support bar in a manner that permits each wheel to move to and from a towed vehicle lowered position and a towed vehicle lifted position comprising;

a first plate containing at least a first aperture and a second aperture;

a second plate containing at least a first aperture and a second aperture;

the first aperture on the first plate and the first aperture on the second plate are sized to receive the spindle and the spindle is rigidly attached to the first and second plates; and the second aperture on the first plate and the second aperture on the second plate are sized to receive a first fastening member which rotatably, releasably attaches each plate to the at least one support bar;

at least a bracket rigidly attached to each at least one support bar wherein each bracket is configured to receive axles and maintain the axles substantially parallel to one another and substantially perpendicular to each at least one support bar, wherein each bracket comprises a series of trusses configured to receive an axle support bar;

each truss is rigidly attached to each axle support bar; and each truss is constructed using a material with a high tensile strength and the axle support bar is constructed using the same or a different material with a high compression strength;

a lift mechanism attached to at least one axle support bars and configured to move at least one of the wheels from the towed vehicle lowered position to the towed vehicle lifted position;

a release mechanism rigidly attached to a release plate which is attached to at least one axle support bar by a second fastening member which rotatably, releasably attaches the release mechanism to the axle support bar and is configured to rotate with the release mechanism;

the release plate configured to rotate the second fastening member to permit at least one of the wheels to move from the towed vehicle lifted position to the towed vehicle lowered position; and a mechanism releasably attached to at least one axle support bars and configured to engage the second fastening member to hold at least one of the wheels in the towed vehicle lifted position, the mechanism being rigidly attached to the structure that releasably attaches each spindle to an axle support bar in a manner that permits each wheel to move to and from a towed vehicle lowered position and a towed vehicle lifted position.

20. The self-loading tow dolly of claim 19 wherein the support bar is a telescoping support bar and the structure releasably attaches each spindle to the telescoping support bar in a manner that permits each wheel to move to and from a towed vehicle lowered position and a towed vehicle lifted position, the telescopic support bar comprises an inner support bar having a fixed length and an outer support bar slideably engaged with the inner support bar in a manner that permits the telescoping support bar to be extended and refracted.

* * * * *